United States Patent

[11] 3,590,894

| [72] | Inventors | John H. Boyd;<br>David O. Cunningham; Robert G. Elms, all of Woodstock, Ontario, Canada |
|---|---|---|
| [21] | Appl. No. | 746,430 |
| [22] | Filed | July 22, 1968 |
| [45] | Patented | July 6, 1971 |
| [73] | Assignee | Timberjack Machines Limited<br>Woodstock, Ontario, Canada |

[54] SHEARING DEVICE
8 Claims, 13 Drawing Figs.
[52] U.S. Cl. .................................................... 144/34 E,
144/3 D, 294/106
[51] Int. Cl. ...................................................... A01g 23/02
[50] Field of Search........................................... 144/22, 3
D, 34, 34 E, 309 AC; 30/228, 237, 238

[56] References Cited
UNITED STATES PATENTS

| 2,748,813 | 6/1956 | Ford | 144/34 |
| 2,799,928 | 7/1957 | Mays | 30/228 |

*Primary Examiner*—Gerald A. Dost
*Attorneys*—Peter Kirby and George A. Seaby

ABSTRACT: A shearing device having a pair of relatively pivotal, coplanar blades for use in cutting through a tree. To counteract the "squeezing out" effect of forcefully closing the blades these are formed by taking a steel plate, cutting it down the center and then forming sharpened edges on it. Prior to these steps the plate is formed in both surfaces with a shallow spherical concavity so that the resultant blades have tapers extending along their edges towards a midpoint. In operation these tapers tend to center the object being cut about such midpoint.

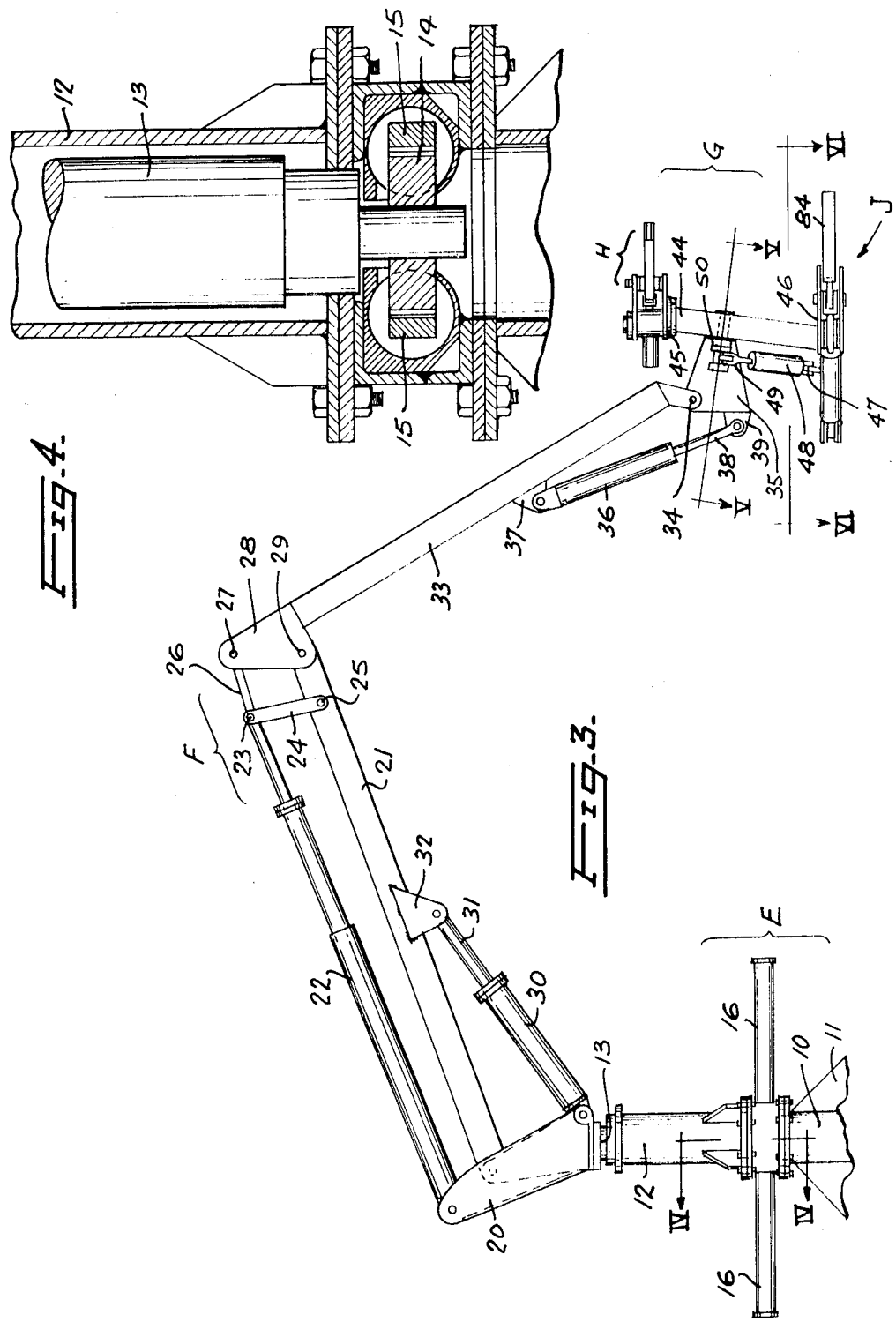

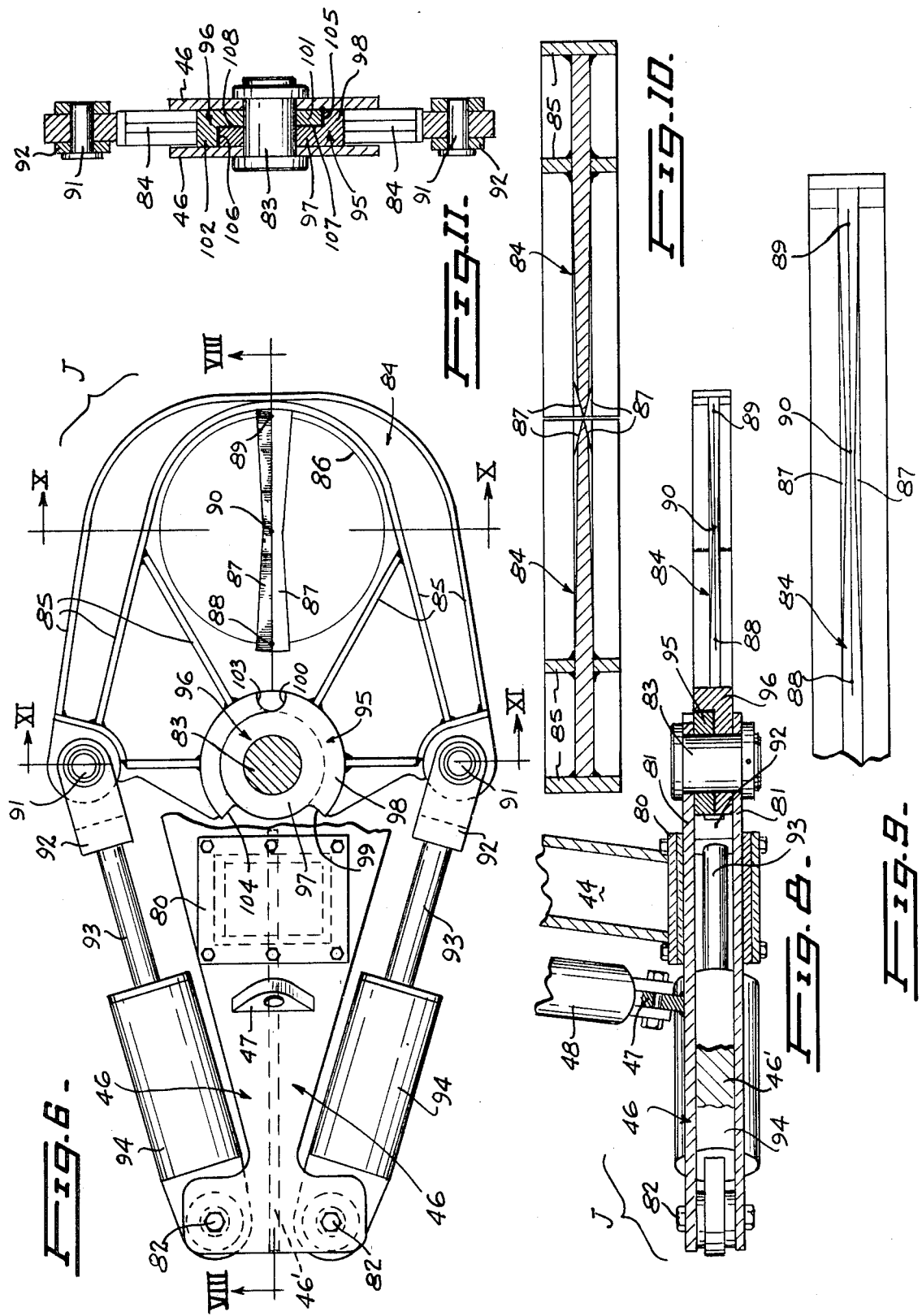

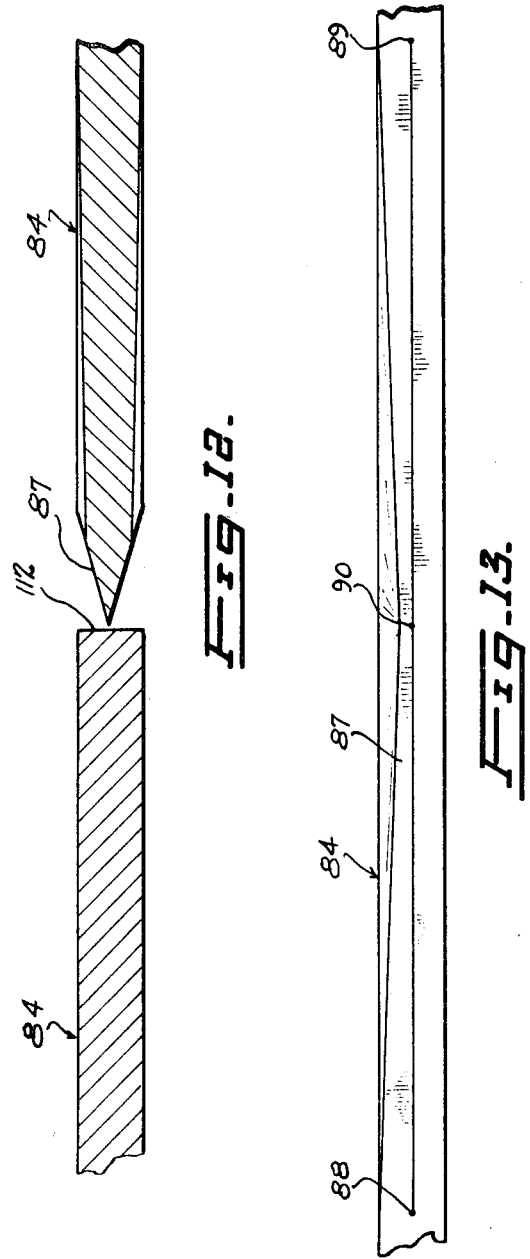

3,590,894

SHEARING DEVICE

RELATED APPLICATIONS

U.S. applications of J. Boyd et al. Ser. Nos. 746,431 and 746,416 filed concurrently herewith and corresponding to Canadian applications of J. H. Boyd et al. Ser. Nos. 012,441 and 012,442, filed Feb. 14, 1968.

This invention relates to improvements in shearing devices and, although the inventive concepts are applicable to a wide variety of types of such devices designed for various different uses, the primary application for which the invention, at least in its preferred form, has been evolved is in the felling of trees.

Timber-harvesting machines have been developed that have a cutting mechanism mounted on the end of a boom which can be extended to bring the mechanism into a cutting position adjacent the base of a standing tree. When this cutting mechanism (or "shearing device" as it is commonly called) takes the form of a pair of pivotally interconnected jaw members each carrying a cutting blade, the method of operation will be to bring the jaws in their open condition into position embracing the tree trunk and then to force them to close, for example by hydraulic driving cylinders. Such closing of the jaws will cut through the tree. It will, however, also exert a substantial "squeezing out" force on the tree, or more accurately since the tree is fixed, will tend to force the shearing device as a whole away from the tree. In consequence the shearing device must be associated with an additional tree-grasping device, and this latter device must be sufficiently strong to resist this "squeezing out" effect.

This difficulty can in some cases be overcome by using a sliding rather than a pivotal relative motion between the jaw members, but such a solution to the problem introduces other complications.

The primary object of the preferred form of the present invention is the provision of a shearing device in which such squeezing out forces can be effectively counteracted or at least minimized by the structure of the cutting blade or blades themselves, thus leaving the designer of the machine free to choose pivotally mounted jaw members, if he so wishes, without at the same time requiring an especially strong associated tree-grasping device, and indeed without requiring a construction as massive as would be called for if the full squeezing out forces had to be resisted by these parts.

This object is achieved according to the invention by using a cutting edge on one or both of a pair of jaw members that is formed with a taper such that its thickness decreases along its length. This has the effect of causing the cutting edge to exert a wedging or longitudinal force (in the direction of extent of the edge) on the object (e.g. tree) during the jaw-closing (cutting) process. Such force can be adjusted by means of the degree of taper giving to the cutting edge to counterbalance, in whole or in part, or even in excess, any other external forces (such as the squeezing-out forces of pivoted jaws) that may be encountered.

In the specific form of the invention described below, the two cutting edges of a pair of pivotally interconnected blades are each formed on each face with a double taper extending from inner and outer longitudinal points towards a central point. The effect of the double taper is to produce a centering effect, the blades tending to balance the opposing forces of the respective tapers.

Another feature of the invention is a novel form of construction of bearing member for use in mounting a pair of pivotal jaw members for such a shearing device, such bearing members being especially adapted to resist the natural tendency of the blades of such devices to twist about an axis perpendicular to the axis of pivoting.

It is believed that this and other features of the invention will be more clearly understood from the specific example described below in connection with the accompanying drawings which illustrate, by way of example only, one form of timber harvesting machine embodying the invention.

The machine itself, which incorporates 012,442 features beyond those with which the present application is directly concerned, is described in greater detail in copending Canadian Pat. application of J. Boyd et al. Ser. No. 012,442 filed concurrently herewith.

In the drawings:

FIG. 3 is a side view, on a larger scale, of the crane and boom of FIG. 1;

FIG. 4 is a section on the line IV-IV in FIG. 3;

FIG. 6 is a section taken on the line VI-VI of FIG. 3 showing the shearing device;

FIG. 8 is a section taken on the line VIII-VIII in FIG. 6;

FIG. 9 is an enlarged view of the right-hand end of FIG. 8;

FIG. 10 is a section taken on the line X-X in FIG. 6;

FIG. 11 is a section taken on the line XI-XI of FIG. 6.

FIGS. 12 and 13 are respectively fragments of FIGS. 10 and 9 showing alternatives.

OVERALL CONSTRUCTION OF MACHINE

Figure 1:
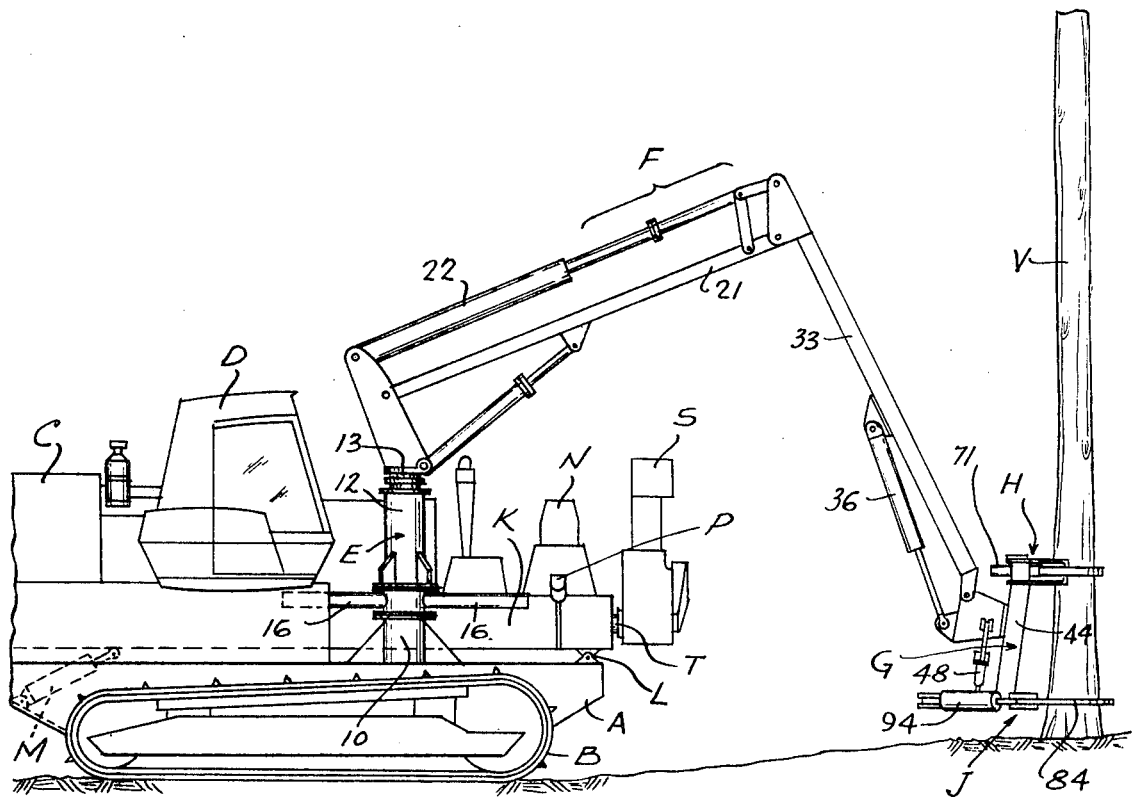
FIG. 1 is a general side view of the entire machine.
Figure 2:
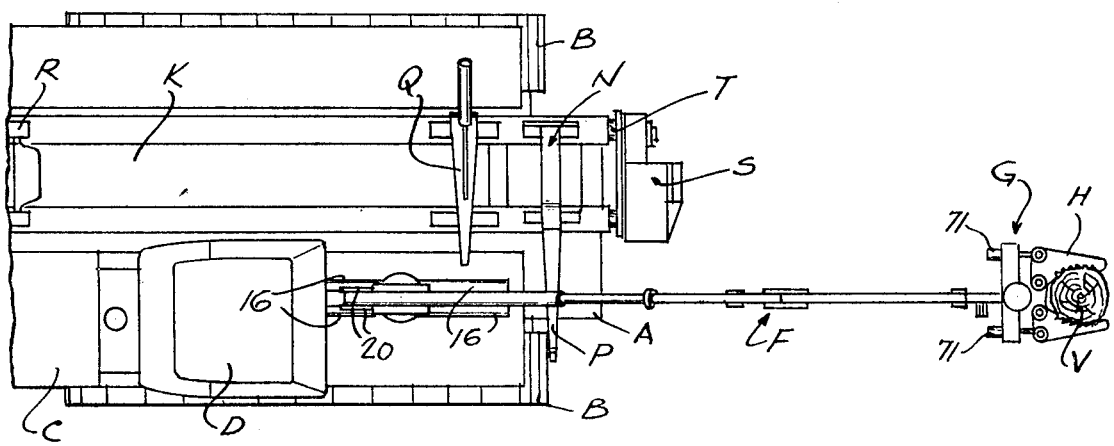
FIG. 2 is a plan view of the machine of FIG. 1.

The main portions of the timber-harvesting machine shown in FIGS. 1 and 2 include a chassis A mounted on endless tracks B. A power assembly C mounted on the chassis A includes a diesel engine, hydraulic and pneumatic pumps and the necessary reservoirs for oil and air under pressure. The tracks B are driven by hydraulic motors (not shown), the entire machine being under control of a single operator who occupies a cab D.

A crane E is mounted forwardly of the cab D on one side of the chassis A and serves to support a boom F, on the remote end of which there is located a tree shear and clamp assembly G having, as its main components, a tree clamp H and a shearing device J.

A processing platform K is pivotally mounted at its front end on the chassis A by pivot pins L. The rear end of the platform K can be raised by means of hydraulic cylinders M to enable the rear of the platform K to be raised slightly and thus effectively to tilt its forward end downwardly to align the centerline thereof and the mechanisms mounted thereon with a felled tree, one end of which rests on the platform and the other end of which rests on the ground.

Mounted at the front end of the processing platform K is a clamp N and a kicker P for cooperating therewith. Mounted behind the clamp N on the processing platform K is a bucking shear Q; and at the rear end of the platform K there is located a butt plate assembly R. A delimbing unit S is situated forwardly of the front end of the processing platform K, being mounted on the ends of cylinder assemblies T.

CONSTRUCTION OF CRANE AND BOOM

Reference is now made to FIGS. 3 and 4 which show details of the crane E and boom F supported thereon. The crane E is mounted on the chassis A by means of a base post 10 reinforced by gusset plates 11. At the top of the base post 10 there is secured a further upwardly extending post 12 containing a shaft 13 on which the boom F is mounted. The shaft 13 is rotatable within the fixed structure of the crane E by means of a toothed wheel 14 secured to the end of the shaft, such toothed wheel 14 meshing with a pair of racks 15 that are slidable under the control of hydraulic cylinders 16. By means of these cylinders, the boom F can be rotated through any desired angle, which may be typically about 300° from one extreme position to the other. If a full 360° turn is required the crane must be extended to provide clearance, or can be mounted on the top of the cab D.

The boom F comprises a multiple plate structure 20 secured to the shaft 13, which plate structure 20 serves pivotally to support one end of a nonextensible beam 21 and also one end of an hydraulically operated telescoping member 22 extending generally parallel with the beam 21. At the remote end of the member 22 a pin 23 serves to connect it pivotally to one end of a link 24, the other end of which is pivotally secured by a pin 25 to the beam 21. The pin 23 also connects the member 22 to a second link 26 which is pivotally secured at its other end by a pin 27 to the top of a bracket 28. A lower part of the bracket 28 is pivotally connected by a pin 29 to the extreme end of the beam 21. Also supported by the plate structure 20 is an hydraulic cylinder 30, the piston 31 of which is connected by a bracket 32 to the beam 21.

Extending forwardly and downwardly from the bracket 28 is a further beam 33, on the lower end of which there is pivotally mounted by a pin 34 a positioning assembly 35 of the tree shear and clamp assembly G. A further hydraulic cylinder 36 connected at one end by a bracket 37 to the beam 33 has its piston 38 connected by a bracket 39 to the positioning assembly 35 to control the attitude thereof about the axis defined by the pin 34.

Figure 5:
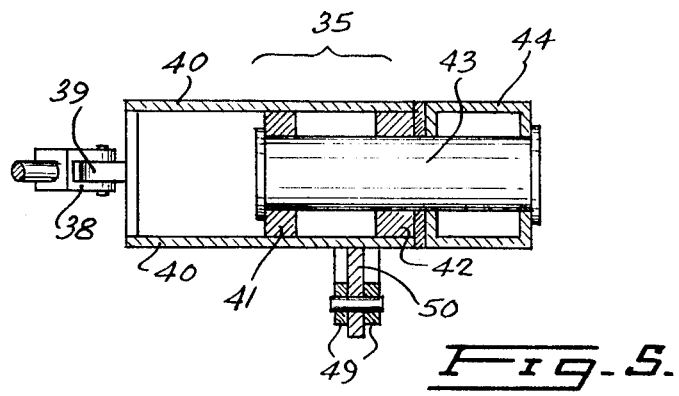
FIG. 5 is a section on the line V-V in FIG. 3 taken through the center of the tree shear and clamp assembly.

As appears from FIG. 5, the positioning assembly 35 consists of a pair of parallel plates 40 supporting bushings 41 and 42 which support a spindle 43 that projects beyond the ends of the plates 40 to pivotally support a post 44, the upper end of which is connected to the body 45 of the tree clamp H and the lower end of which is connected to the body 46 of the shearing device J.

As can best be seen from FIG. 8 the body 46 of the shearing device J includes on its upper surface a lug 47 to which there is connected one end of an hydraulic cylinder 48, the piston 49 of which is connected to a lug 50 that projects from one side of the positioning assembly 35 (FIG. 5). Inward and outward movement of the piston 49 will have the effect of causing the entire assembly G including the post 44 to rotate about the axis defined by the spindle 43, which axis is approximately horizontal.

CONSTRUCTION OF SHEARING DEVICE

The details of construction of the shearing device J are shown in FIGS. 6 to 11. The body 46 of this device is secured to the base of the post 44 by means of a flange 80, this body 46 consisting of a pair of spaced apart, parallel plates 81 connected together at one end by a pair of pins 82, down the center by a gusset plate 46' and at the other end by a large pin 83 which also acts as a pivot pin for a pair of shear blades 84.

Figure 7:
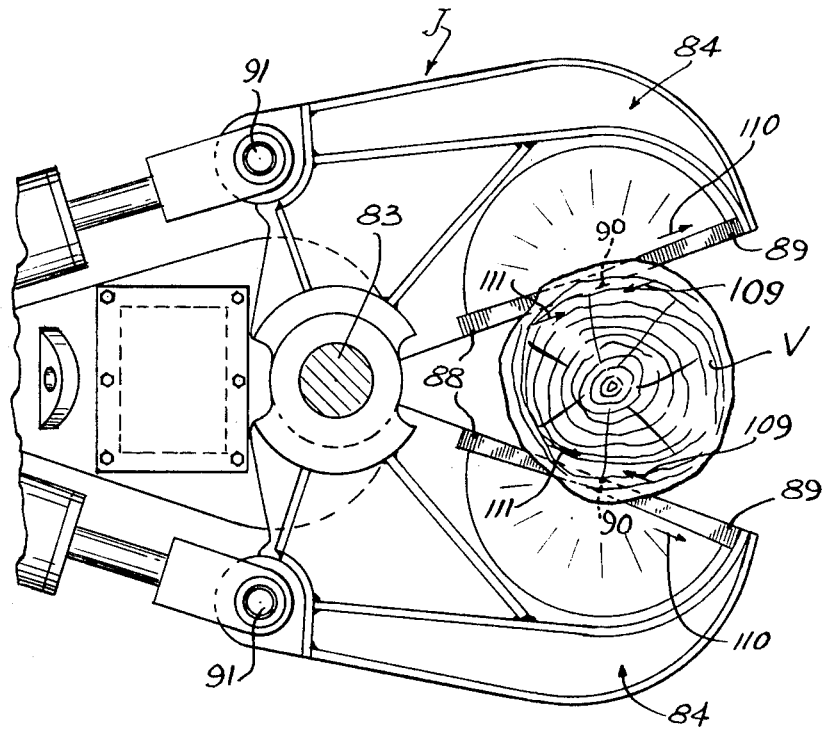
FIG. 7 is a view similar to FIG. 6 demonstrating diagrammatically the operation of the shearing device.

The shear blades 84 are made by taking a single sheet of metal and machining a shallow concavity in each surface of circular outline. The shape of this concavity may be part spherical, or conical, or otherwise as may be convenient to form. The boundary of this concavity on the visible side of the blades 84 is shown by the circle 86 in FIG. 6. It will be the same on the underside. The sheet is then cut down the middle, that is along the line on which the section of FIG. 7 is taken in FIG. 6. Cutting surfaces 87 are then formed on the separated edges. The result of this manner of manufacture is that the blades 84 taper in both directions: they taper inwardly towards their cutting edges along the central line on which the section of FIG. 10 is taken; at the same time they also taper along the cutting edges themselves from inner and outer points 88 and 89 on the circle 86 to a minimum width in the center at 90, as best appreciated from FIG. 9. It is to be understood that the term "cutting edge" is used to include more than just the very extreme edge. The very extreme edge cannot have a taper; it is theoretically a single line with no width dimension. The lengthwise taper is actually formed on the portions of the cutting edges that lie just behind the extreme edge, i.e. the surfaces 87.

Each of the blades is then provided with vertically extending reinforcing bars 85. On assembly, each of the blades 84 is connected by a pin 91 to a fork 92 secured to the end of a piston rod 93 of an hydraulic cylinder 94 the other end of which is secured to the body 46 by one of the pins 82.

The blades 84 pivot about the main pin 83 by means of a bearing structure consisting of a pair of bearing members 95 and 96 each connected to a respective blade 84. The bearing member 95 has a radially inward portion 97 that extends the full distance around the bearing assembly and an outer portion 98 that extends circumferentially between ends 99 and 100 (FIGS. 7 and 11). As shown in FIG. 11, the outer portion 98 of the bearing member 95 projects axially into the plane of a radially inward portion 101 of the other bearing member 96 to embrace the same. The portion 101 corresponds to the portion 97 in that it is an inner portion extending around the full circumference of the bearing assembly and is connected to an outer portion 102 that embraces the other inner portion 97 and extends circumferentially only between points 103 and 104.

This manner of constructing the bearing members 95, 96 has the effect of providing in a simple manner both cylindrical bearing surfaces 105 and 106 extending circumferentially of the axis defined by the axis of the pin 83, and flat bearing surfaces 107 and 108 extending radially of such axis. The result is a bearing structure that is highly resistant to twisting, that is to say any tendency for the two bearing members 95 and 96 to be forced to positions in which they are no longer coaxial. It will be appreciated that the very high forces that must be exerted as the blades 84 are closed to cut through a tree may well give rise to such a tendency for the bearing members to twist, particularly if one of the blades should encounter a disuniformity in the shape or hardness of a portion of the tree.

OPERATION OF SHEARING DEVICE

The tapering of the blades 84 in the direction along their cutting edges (i.e. as seen in FIG. 9) has the important advantage of overcoming the tendency that the pivotally closing blades would normally have of squeezing the tree out from between them. The portions of the blades 84 lying between the points 89 and 90 each have a taper extending along their cutting edges inwardly towards the respective point 90. This taper will exert forces 109 (FIG. 7) on a tree being cut, such forces acting towards the point 90. Conversely, this effect may be looked upon as representing forces 110 acting on the shearing device J as a whole tending to pull it up firmly towards the tree. The taper on each blade between the points 88 and 90 tends to work in the opposite direction, i.e. to push the tree away (forces 111). The resultant is a tendency to center the tree around the central points 90 of the longitudinal blade taper, or at least to center the tree on some point not very far removed from the point 90 of each blade 84.

The overall operation of the tree shear and clamp assembly G mounted on the end of the boom F will be readily apparent from FIGS. 1 to 3. The operator will bring the vehicle to a suitable location adjacent a stand of trees. He will then control the crane E and its boom F by means of the various hydraulic cylinders already described. He will also ensure that the post 44 is in the correct attitude for the assembly G to embrace a selected standing tree V, such attitude being controlled by hydraulic cylinders 36 and 48. In this manner the assembly G is moved into an embracing position around the tree V with both its tree clamp H and its shearing device J in open condition. The jaws of the tree clamp H are then closed by means of cylinders 71 to grasp the tree firmly, in the manner shown in FIG. 2. Next the cylinders 94 are operated to force closed the blades 84 of the shearing device J and cut through the tree. The blades 84 are now retained in their closed position so that they act as a support underlying the butt of the severed tree. The upper portions of the reinforcing members 85 immediately surrounding the butt of the tree may at the same time act as stops to limit sideways movement of the butt of the tree.

The detailed structure and operation of the other parts of the machine will not be further described herein, since they do not relate to the inventive advance with which the present application is concerned. They are described in full in copending Canadian Pat. application of J. Boyd et al., Ser. No. 012,442 filed concurrently herewith.

ALTERNATIVES AND BROAD SCOPE

It will be appreciated that the construction illustrated in the accompanying drawings is the preferred form of the invention, but that the inventive concept is broader in scope in that it encompasses various possible variations.

For example, the concept of providing a cutting blade with a taper along its length may be applied to only one blade of a cutting tool. As shown in FIG. 12, which is a modified fragment of FIG. 10, such a tool could then have an ordinary, untapered cutting edge 112 to cooperate with the first blade and constituting an unsharpened anvil. The blade 84 shown in FIG. 12 will continue to be formed with a cutting surface 87 having the same double taper as shown for the surfaces 87 in FIGS. 6 and 9. Moreover, it is not essential that the relatively movable blades or jaws be pivotally connected together; the self-centering effect of the double, inward taper is also applicable to blades that slide together, although it is of special advantage in the case of pivoting jaws, because it has the ability to counteract the "squeezing-out" effect that pivoting jaws have on the workpiece.

It should also be appreciated that the tapering effect need not necessarily be obtained by forming a concavity in both faces of the blade pair. An effective tapering can be obtained from a concavity in one face only, as shown in FIG. 13 where the lower face of the blade is untapered.

Finally, although the use of a double taper is normally preferred, that is a taper from each of a pair of inner and outer points 88 and 89 towards a center point 90, it is within the broad concept of the invention to provide only a single taper extending from an outer point towards an inner point. The effect of such a single taper (i.e. in a single direction; it may be formed on both blades and on both faces of the blades) will be to exert an inward force on the workpiece, rather than a centering force, but this may not necessarily be undesirable, since it will continue to counteract the squeezing-out effect of pivoted jaws as they close on the workpiece.

Thus in its broadest concept the invention can be defined as the provision of a cutting edge on at least one of a pair of jaw members movable between open and closed positions, wherein the cutting edge is formed with a taper such that its thickness decreases along its length in order to exert a controlling force in the direction of such length on an object that is being sheared by relative closing movement of the jaw members. As above mentioned, the term "cutting edge" is here used to refer to the edge portion of finite width that extends back from the extreme edge of the blade, rather than to the extreme edge itself which is merely a line (assuming perfect sharpness).

We claim:

1. A shearing device comprising
   a. a pair of jaw members at least one of which has an elongate cutting edge,
   b. means mounting said members for relative movement between an open position defining a jaw to receive an object to be sheared and a closed position in which said members are moved together to close said jaw and shear said object,
   c. said cutting edge being formed with a first taper such that the thickness of said edge decreases along its length in the direction from a first point thereon to a second point thereon, and with a second taper such that the thickness of said edge decreases along its length in the direction from a third point thereon to said second point, said last-mentioned direction being opposite to the direction from the first to the second point whereby during closing movement of the jaw members to exerted forces are exerted on the object tending to center the same in the vicinity of said second point.

2. A shearing device according to claim 1, wherein each jaw member is formed with a cutting edge and each of said cutting edges is formed with both said tapers, said tapers on each edge extending from respective said first and third points towards a said second point, the second points of the two edges being substantially coincident with each other in the longitudinal direction of the edges in the closed position of the jaw members.

3. A shearing device according to claim 2, wherein said jaw members comprise a pair of coplanar blades, each blade being provided with a shallow depression on one face thereof, said depressions in the closed position of the jaw together defining a shallow concavity having a circular outline described about said coincident second points whereby said blades taper radially inwardly towards said second points.

4. A shearing device according to claim 3, wherein said concavity is formed on both faces of the blade pair.

5. A shearing device according to claim 1, wherein said mounting means comprise means for pivotally interconnecting the jaw members for movement between said open and closed positions.

6. A shearing device comprising:
   a. a frame member,
   b. a blade member,
   c. means pivotally mounting said blade member on said frame member for relative movement therebetween from an open position defining a jaw to receive an object to be sheared and a closed position in which said blade and frame are moved relatively together to close said jaw and shear said object,
   d. power means operatively associated with said blade to move said jaw between said open and said closed position,
   e. said blade member having an elongate cutting edge formed with a first taper such that the thickness of said edge decreases along its length in the direction from a first point thereon to a second point thereon, and with a second taper such that the thickness of said edge decreases along its length in the direction from a third point thereon to said second point, said last-mentioned direction being opposite to the direction from the first to the second point whereby during closing movement of the jaw forces are exerted on the object tending to center the same in the vicinity of said second point.

7. A shear mechanism comprising:
   a. a frame,
   b. a blade member having a generally concave depression in one surface thereof and a taper along one portion of the concave surface terminating in a cutting edge,
   c. means for pivotally mounting the blade member on said frame for relative movement therebetween from an open position defining a jaw to receive an object to be sheared and a closed position in which said blade and frame are moved relatively together to close said jaw and shear said object, and
   d. power means operatively associated with said blade to move said jaw between said open and said closed position.

8. A shear mechanism comprising:
   a. a frame,
   b. a blade member having a generally concave depression in both opposite surfaces thereof to form tapers along one portion of the concave surfaces terminating in a cutting edge,
   c. means for pivotally mounting the blade member on said frame for relative movement therebetween from an open position defining a jaw to receive an object to be sheared and a closed position in which said blade and frame are moved relatively together to close said jaw and shear said object, and
   d. power means operatively associated with said blade to move said jaw between said open and said closed position.